United States Patent
Schüler et al.

(10) Patent No.: US 6,364,272 B1
(45) Date of Patent: Apr. 2, 2002

(54) STOP ELEMENT FOR LIMITING THE REGULATING DISTANCE OF A LONGITUDINAL ADJUSTMENT DEVICE FOR SEATS, ESPECIALLY MOTOR VEHICLE SEATS

(75) Inventors: Rolf Schüler, Heiligenhaus; Joachim Flick, Hückeswagen, both of (DE)

(73) Assignee: Keiper GmbH & Co., Kaiserslautern (DE)

( * ) Notice: Subject to any disclaimer, the term of this patent is extended or adjusted under 35 U.S.C. 154(b) by 0 days.

(21) Appl. No.: 09/601,710

(22) PCT Filed: Feb. 3, 1999

(86) PCT No.: PCT/EP99/00690

§ 371 Date: Sep. 12, 2000

§ 102(e) Date: Sep. 12, 2000

(87) PCT Pub. No.: WO99/39933

PCT Pub. Date: Aug. 12, 1999

(30) Foreign Application Priority Data

Feb. 5, 1998 (DE) .......................................... 198 04 506

(51) Int. Cl.$^7$ ............................................... F16M 13/00
(52) U.S. Cl. ...................................................... 248/424
(58) Field of Search ............................. 248/345.1, 424, 248/429; 297/188.31

(56) References Cited

U.S. PATENT DOCUMENTS

| | | | |
|---|---|---|---|
| 3,279,737 A | 10/1966 | Krause | 248/430 |
| 5,242,143 A | 9/1993 | Nagashima et al. | 248/345.1 |
| 5,275,369 A | 1/1994 | Kamata et al. | 248/345.1 |
| 5,454,541 A | * 10/1995 | Ito | 248/430 |
| 5,482,243 A | 1/1996 | Minder | 248/345.1 |
| 5,806,825 A | * 9/1998 | Couasnon | 248/429 |
| 6,227,596 B1 | * 5/2001 | Foucault et al. | 296/65.13 |

FOREIGN PATENT DOCUMENTS

| | | |
|---|---|---|
| DE | 4105231 | 9/1992 |
| DE | 196 50 698 A1 | 6/1998 |
| EP | 196 47 448 A1 | 6/1998 |
| FR | 2746721 | 10/1997 |

* cited by examiner

*Primary Examiner*—Ramon O. Ramirez
(74) *Attorney, Agent, or Firm*—Friedrich Kueffner

(57) ABSTRACT

A stop element for limiting the regulating distance of a longitudinal adjustment device for motor vehicles seats, whose seat part is fastened on sliding rails, wherein each sliding rail is longitudinally slidable in a guide rail secured on the vehicle floor and at least one sliding rail can be secured on the guide rail in selectable longitudinal positions by means of a locking device, is provided between the sliding rail and the guide rail. The stop element is formed of an impact member, having a snap-in head penetrating a penetration of the guide rail, and a locking hook, penetrating this impact member and lockingly engaging the guide rail.

9 Claims, 4 Drawing Sheets

STOP ELEMENT FOR LIMITING THE REGULATING DISTANCE OF A LONGITUDINAL ADJUSTMENT DEVICE FOR SEATS, ESPECIALLY MOTOR VEHICLE SEATS

BACKGROUND OF THE INVENTION

1. Field of the Invention

The invention relates to a stop element for limiting the regulating distance of a longitudinal adjustment device for seats, especially motor vehicle seats, whose seat part is fastened on sliding rails, wherein each sliding rail is longitudinally slidable in a guide rail which is secured on the vehicle floor, wherein at least one sliding rail can be secured on the guide rail in selectable longitudinal positions by means of a locking device, wherein between the sliding rail and the guide rail the stop element is provided.

2. Description of the Related Art

From DE 196 47 448 a rail arrangement comprised of guide rails and sliding rails with integrated longitudinal adjustment device is known in which the sliding travel stroke between the sliding rail and the guide rail is limited in a conventional manner. In this context, the limitation is, for example, in the form of wall portions bent out of the rails and used as stop elements.

Moreover, it is conventional to provide bolts or similar components on the rails which serve as stop elements. Such stop elements are non-elastic so that relatively high forces act on the stop elements, resulting, in turn, in loud contact noise when the movable sliding rail suddenly impacts on the stop elements, especially when the sliding stroke is carried out vehemently and hard. Moreover, the manufacture of stop elements in the aforementioned manner requires additional process steps when manufacturing the guide rails and the sliding rails.

SUMMARY OF THE INVENTION

It is an object of the invention to provide a stop element between the guide rail and sliding rail which, on the one hand, is elastic and, on the other hand, does not require a preparatory manufacturing process on the rails. This object is solved by the stop element being comprised of an impact member, having a snap-in head extending through a penetration of the guide rail, and of a locking hook, penetrating this impact member and lockingly engaging the guide rail. Such a stop element comprised of an impact member and a locking member can be secured because of its two-part configuration by means of a locking hook in already present penetrations in the bottom of the guide rail, which penetrations form a tooth row for the locking device, so that a special manufacturing expenditure for the purpose of attaching the stop element is eliminated. Moreover, such a stop element can be produced of plastic material, wherein preferably an elastic, thermoplastic plastic material can be used for the impact member, while the locking hook may be formed of a high-strength and tenacious plastic material.

For fixation of the stop element on the guide rail, the impact member advantageously has a through hole, designed to be penetrated by the locking hook and extending to the edge portion of the snap-in head, while the lower portion of the locking hook has a design for complementing the snap-in head in the area of its through hole. In this connection, the impact member may have an approximately rectangular base surface with an impact tip pointing in the direction of the longitudinal axis and may have at its underside the snap-in head which fits into the penetration of the upwardly curved bottom of the guide rail, wherein the snap-in head is provided with locking projections pointing in the longitudinal direction of the guide rail and engaging the bottom of the guide rail from below.

For the purpose of a secure clamping of the impact member on the guide rail, the locking hook is provided at its upper side with a projection supported on a shoulder of the impact member and is provided at its underside with a locking projection complementing the locking projections of the snap-in head. In certain embodiments, the sliding rail itself, or its sliding cage, can impact on this secured stop element; however, it is also possible that the latch support receiving the locking device will come to rest on the stop element. In order to be able to safely support the stop element for the force uptake when the guide rail or its components impact, the impact member has support fingers at its reward portion remote from the impact tip which rest against the bottom of the guide rail. In this connection, the laterally projecting support fingers may each have an upwardly curved portion at their free ends which may be provided for realizing a contact surface for the ball retainer cages.

BRIEF DESCRIPTION OF THE DRAWINGS

The invention is represented by one embodiment in the drawing and will be explained in the following in more detail. It is shown in.

DESCRIPTION OF PREFERRED EMBODIMENTS

Figure 1:
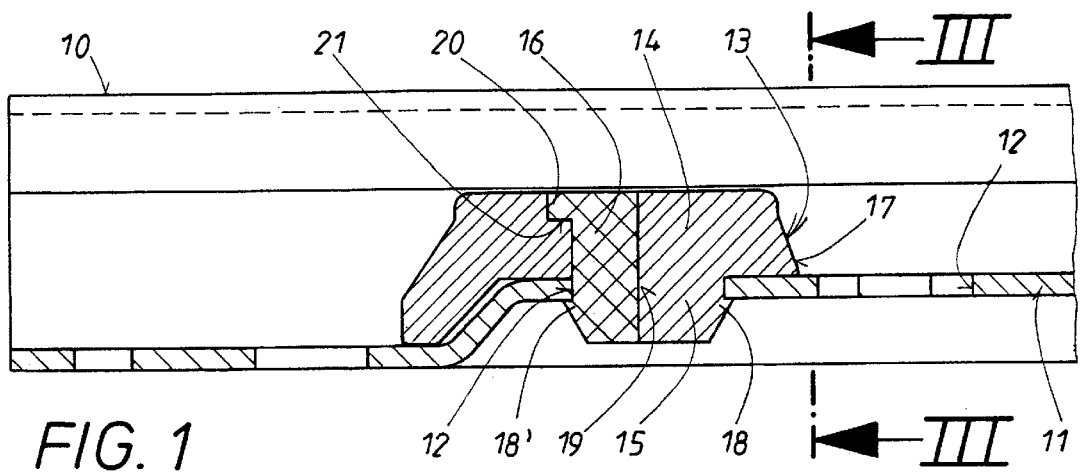
FIG. 1 the end portion of a guide rail with the stop element secured thereat, in longitudinal section.
Figure 2:
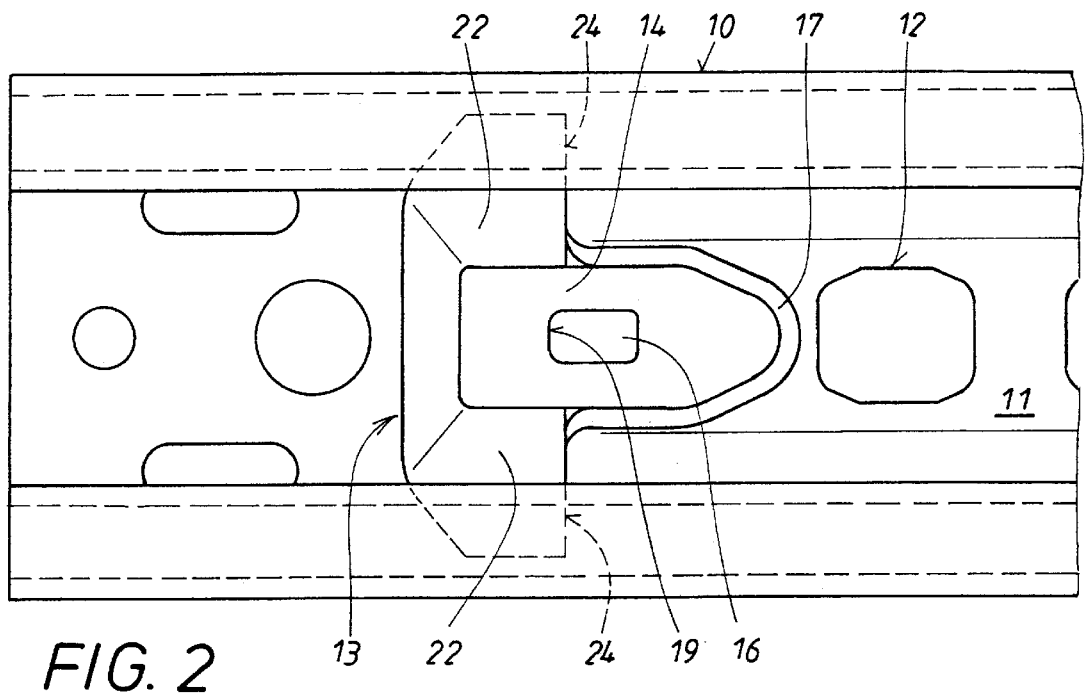
FIG. 2 the end portion of the guide rail with the stop element secured thereat in a plan view.
Figure 3:
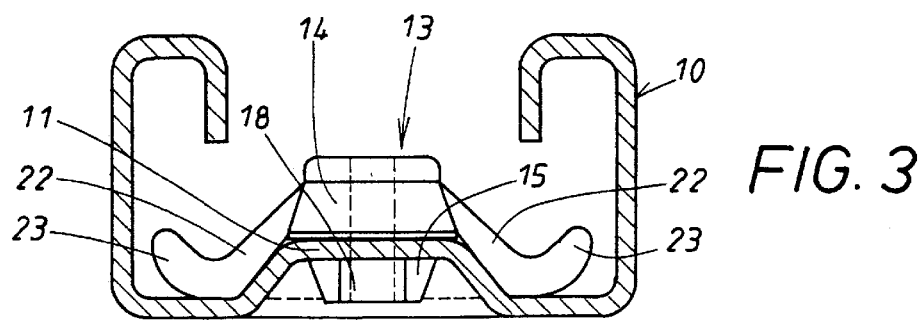
FIG. 3 the guide rail provided with the stop element in a cross-sectional view along the line III—III of FIG. 1, FIG. 4 the stop element in a side view.
Figure 4:
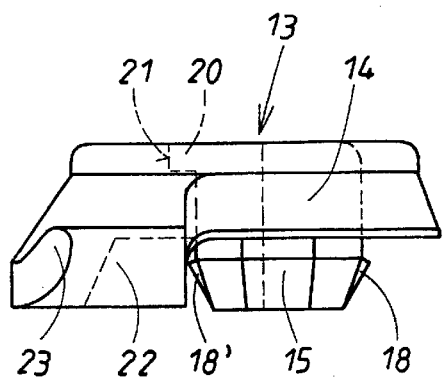
Figure 5:
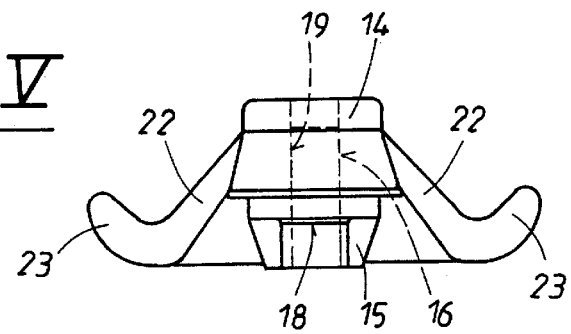
FIG. 5 the stop element in a front view in the direction of arrow V of FIG. 4.
Figure 6:
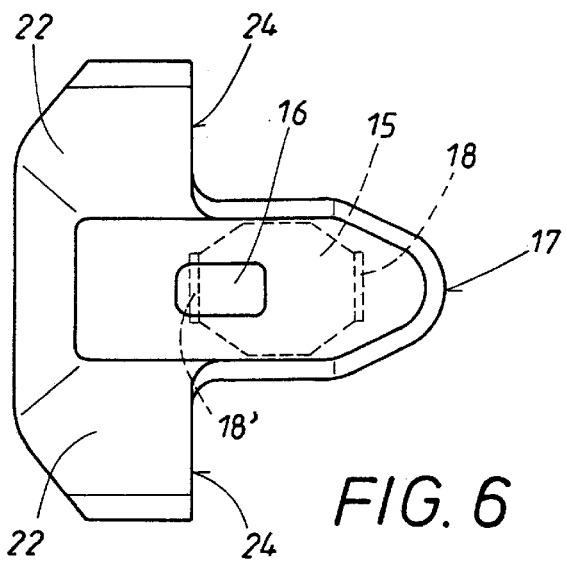
FIG. 6 the stop element in a plan view.
Figure 7:
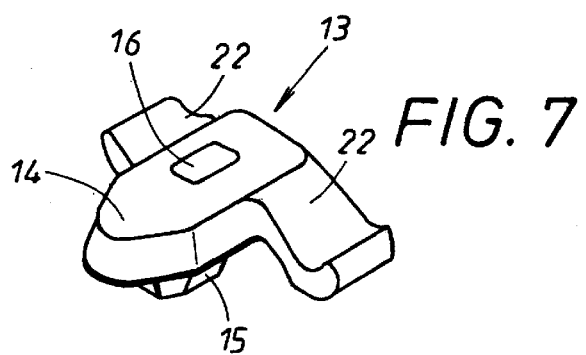
FIG. 7 the stop element in a perspective representation on a smaller scale than that in FIGS. 1 through 6.
Figure 8:
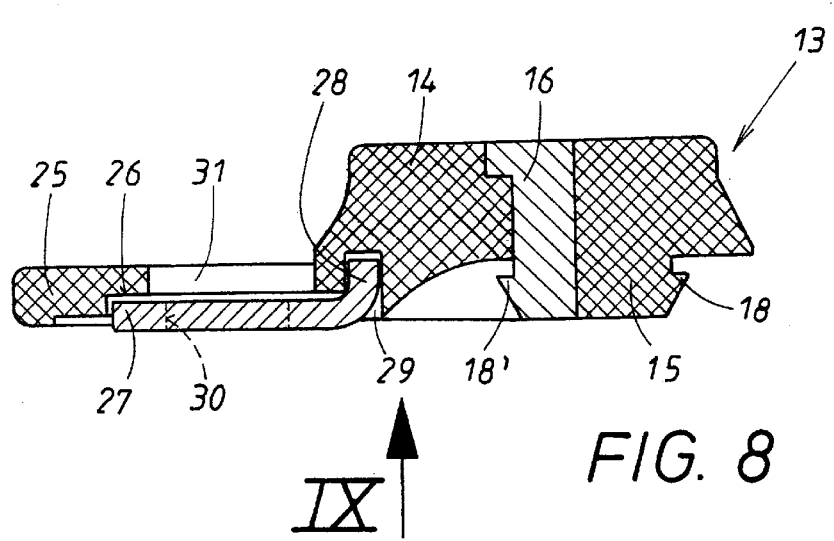
FIG. 8 the stop element with an inserted washer in a further embodiment in longitudinal section along the line VIII—VIII of FIG. 9.
Figure 9:
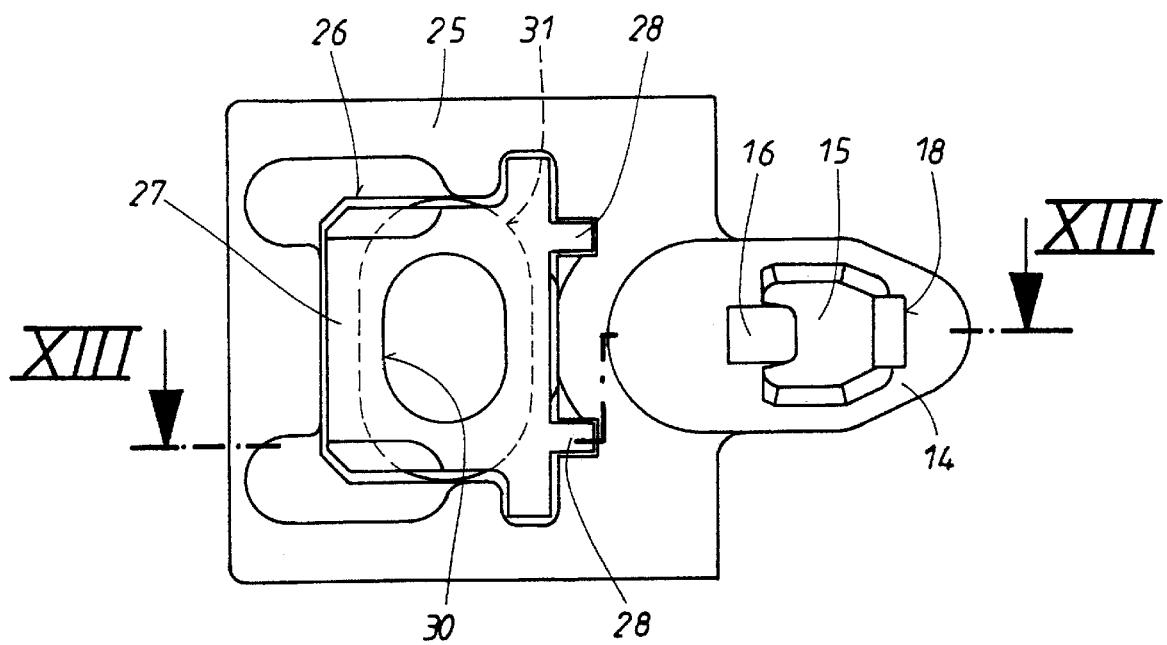
FIG. 9 the stop element illustrated in FIG. 8 in a bottom view in the direction of arrow IX.
Figure 10:
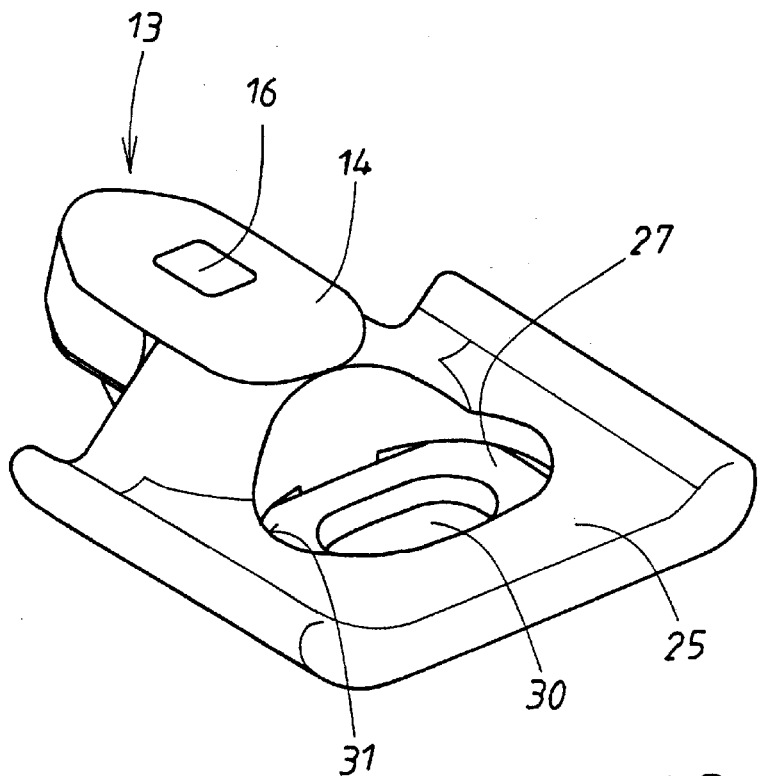
FIG. 10 the stop element according to FIGS. 8 and 9 in a perspective representation.
Figure 11:
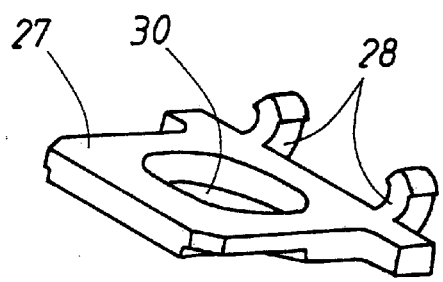
FIG. 11 the washer insertable into the stop element, also in a perspective representation.

The guide rail 10 illustrated in FIGS. 1 through 3, has, with the exception of its end portions, an upwardly curved bottom 11 in which a row of successively arranged penetrations 12 is provided that form a tooth row for a locking device. The planar end portions of the bottom of the guide rail 10 are provided with corresponding cutouts for fastening the guide rail 10 on the vehicle floor; these, however, are of no consequence in regard to the stop element 13.

This stop element 13 is comprised of an impact member 14 and a snap-in head 15, which is connected to the impact member 14 as a monolithic part, as well as a locking hook 16 inserted into the impact member 14 and the snap-in head 15. In this connection, the impact member 14 with the snap-in head 15 may be formed of an elastic, thermoplastic plastic material, while the locking hook 16 can be comprised of a high-strength and tenacious plastic material. The impact member 14, which is arranged above the bottom 11 of the guide rail 10 and has a rectangular base surface, comprises an impact tip 17. This impact tip 17, when the stop element 13 is mounted in its proper position, points away from the respective end portions of the guide rail 10 toward its inner longitudinal extension. The snap-in head 15 which is a monolithic part of the impact member 14 fills the penetration 12 in the bottom 11 of the guide rail 10 completely and projects past it in the downward direction. In this connection, locking projections 18 are formed on end faces, pointing in the longitudinal direction of the guide rail 10, of the portion of the snap-in head 15 projecting from the bottom 11 and, in the mounted position, they engage below the upwardly curved bottom 11 of the guide rail 10.

Impact member 14 and snap-in head 15 are penetrated by a through hole 19 extending perpendicularly to the longitudinal direction of the guide rail 10, wherein this through hole 19 is arranged such that it includes an edge area of one end face of the snap-in head 15. This through hole 19 is provided to receive the locking hook 16 which also comprises a locking projection 18' at its underside. The locking projection 18' is similar in its configuration to the locking projection 18 on the snap-in head 15. At its upper side the locking hook 16 is provided with a projection 20 on the same side where the locking projection 18' is located, and the projection 20 engages the shoulder 21 in the upper side of the impact member 14 in the mounted position and secures the impact member 14 on this end face of the snap-in head 15 at the bottom 11 of the guide rail 10. In its rearward area, opposite the impact tip 17, the impact member 14 has two laterally projecting support fingers 22 which are supported on the bottom of the guide rail 11. Moreover, the free ends of the support fingers 22 have upwardly curved portions 23 which form contact surfaces 24 for the guide rail or their ball retainer cages when the guide rail is in the end position.

In deviation from the aforedescribed embodiment, the support fingers 22 can also be integrated components of a plate 25 which adjoins the rearward area of the impact member 14. This plate 25 has at its underside a recess 26 which receives a washer 27, comprised of a different material, preferably metal, in such a way that it projects with its underside slightly relative to the underside of the plate 25. In this embodiment the washer 27 has two upwardly projecting locking fingers 28 which hook into a recess 29 of the impact member 14, respectively, and secure the washer 27 on the plate 25. The washer 27 has a central hole 30 which can be penetrated by a fastening screw in order to be able to secure the plate 25 of the stop element 13 on the guide rail 10 or on the vehicle floor. Above the central hole 30 of the washer 27, a penetration 31 for receiving a screw head is arranged in the plate 25.

As already mentioned, the represented and above described embodiment of the invention is only to be seen as an example and the invention is not limited to it. Instead, several changes and other embodiments of the subject matter of the invention are conceivable. Moreover, all new features mentioned in the description and/or illustrated in the drawing are important for the invention, even if they are not expressly claimed in the claims.

What is claimed is:

1. A stop element for limiting the regulating distance of a longitudinal adjustment device for seats, especially motor vehicle seats, whose seat part is fastened on sliding rails, wherein each sliding rail is longitudinally slidable in a guide rail secured on the vehicle floor, wherein at least one sliding rail is configured to be secured on the guide rail in selectable longitudinal positions by a locking device, wherein the stop element is positioned between the sliding rail and the guide rail, wherein the stop element (13) is comprised of an impact member (14), having a snap-in head (15) extending through a penetration (12) of the guide rail (10), and a locking hook (16), penetrating the impact member (14) and lockingly engaging the guide rail (10).

2. The stop element according to claim 1, characterized in that the impact member (14) with its snap-in head (15) is formed of an elastic material and the locking hook (16) is formed of a high-strength and tenacious plastic material or metal.

3. The stop element according to claim 1, wherein the impact member (14) has a through hole (19) configured to be penetrated by the locking hook (16) and extending to the edge area of the snap-in head (15), and wherein the locking hook (16) has a lower area having a configuration for complementing the snap-in head (15) in the area of the through hole (19).

4. The stop element according to claim 1, wherein the impact member (14) has a substantially rectangular base surface with an impact tip (17) oriented in the longitudinal axis, wherein the snap-in head (15) is provided at an underside of the impact member (14) and fits into the penetration (12) provided in an upwardly curved bottom (11) of the guide rail, wherein the snap-in head (15) has locking projections (18) pointing in the longitudinal direction of the rail and engaging from below the bottom (11) of the guide rail.

5. The stop element according to claim 1, wherein the locking hook (16) has an upper side with a projection (20) and an underside with a locking projection (18'), wherein the projection (20) is supported on a shoulder (21) of the impact member (14) and the locking projection (18') complements the locking projection (18) of the snap-in head (15).

6. The stop element according to claim 4, wherein the impact member (14) has a rearward area located remote from the impact tip (17) and provided with support fingers (22).

7. The stop element according to claim 6, wherein the support fingers (22) are formed laterally on the impact members (14) and have contact surfaces (24) forming stops for the ball cages.

8. The stop element according to claim 6, wherein the support fingers (22) are formed as a plate (25) having an underside configured to receive a washer (27).

9. The stop element according to claim 8, wherein the washer (27) has at least one locking finger (28) and the impact member (14) has a recess (29), wherein the washer (27) is secured in hook fashion with the at least one locking finger (28) in the recess (29) provided in the impact member (14).

* * * * *